Figure 3:

(No Model.)　　　　　　　　　　　　　　　　4 Sheets—Sheet 1.
T. M. BROWN.
BLANK FORM FOR KEEPING ACCOUNTS.

No. 490,135.　　　　　　　　　　　Patented Jan. 17, 1893.

*Fig. 1.*

Witnesses:　　　　　　　　　　　　　　Inventor:
Richard W. Ashton　　　　　　　　Theodore Miles Brown
Joseph R. Hubbard (No Model.) 4 Sheets—Sheet 2.

T. M. BROWN.
BLANK FORM FOR KEEPING ACCOUNTS.

No. 490,135. Patented Jan. 17, 1893.

Fig. 2.

WITNESSES:
Fred G. Dieterich
Amos W. Hart

INVENTOR:
Theodore M. Brown
BY
ATTORNEYS (No Model.)  4 Sheets—Sheet 3.

T. M. BROWN.
BLANK FORM FOR KEEPING ACCOUNTS.

No. 490,135.  Patented Jan. 17, 1893.

WITNESSES:
Fred G. Dieterich
Amos W. Hart

INVENTOR:
Theodore M. Brown.
BY Munn &Co
ATTORNEYS (No Model.)  4 Sheets—Sheet 4.

T. M. BROWN.
BLANK FORM FOR KEEPING ACCOUNTS.

No. 490,135.  Patented Jan. 17, 1893.

Fig. 4.

WITNESSES:
Fred G. Dieterich
Amos W. Hart

INVENTOR:
Theodore M. Brown

BY [signature]
ATTORNEYS

UNITED STATES PATENT OFFICE.

THEODORE MILES BROWN, OF TROY, MINNESOTA.

BLANK FORM FOR KEEPING ACCOUNTS.

SPECIFICATION forming part of Letters Patent No. 490,135, dated January 17, 1893.

Application filed May 4, 1891. Serial No. 391,597. (No specimens.)

*To all whom it may concern:*

Be it known that I, THEODORE MILES BROWN, a citizen of the United States, residing at Troy, in the county of Pipestone and State of Minnesota, have invented an Improved Sheet Form for Keeping Accounts, of which the following is a full and exact description.

My invention is embodied in a page, or sheet, ruled or inscribed in the manner hereinafter described, and shown in accompanying drawings, in which Figure 1 is a plan view of such sheet or page with the permanent inscriptions thereon and Figs. 2, 3 and 4 show each a portion of the same page, magnified and having entries illustrating the use of the invention in the practical keeping of accounts, as hereinafter particularly described.

The object I have in view is to lessen the labor involved in keeping accounts in the usual way; and, in carrying out my invention, I rule a page or sheet (preferably a double-page sheet) so that it has ten or more special columns, $a$, arranged vertically, parallel, for recording individual accounts; and, parallel to and at the right of such columns, $a$, are two more similar ones, $a'$ $a^2$, for totals, the column $a'$ being for totals of debits and credits for each day, and the other, $a^2$, for grand totals of all preceding accounts at the close of a certain period, say a month, as will be hereinafter described. In the spaces above the columns $a'$ $a^2$ are placed the permanent headings "Daily totals" and "Grand totals" as shown. The footing column $a^3$ is subdivided having at the head of its divisions the permanent headings "Footings" and "Grand footings." These twelve vertical columns $a$, $a'$, $a^2$, are sub-divided by heavy horizontal lines, $c$, into twenty seven parts, or sub-divisions $x$, corresponding to the greatest possible number of business days that can occur in any month. Each such space or sub-division is in turn sub-divided by a vertical line, to separate debits from credits, and the debit and credit spaces thus formed are again divided horizontally by two, faint, parallel lines, whereby spaces are provided for the following purposes, to wit; the long space which is directly below a heavy horizontal line, $c$, is for the entry of names of parties (when required) with whom accounts are opened. The two middle spaces are for posting daily debit or credit balances, which is in practice done with red ink so that the balance of each particular account for each day, may be readily ascertained by inspection. In this instance, the entries in said middle spaces can not be made in red, and they are distinguished by "surface shade" lines as will appear from inspection of Figs. 2, 3 and 4. The two lower spaces in each sub-division $x$ are for debits and credits of an individual account. In the broad space at head of sheet is entered the general heading, or title of the company, or party, to whom the account belongs and by whom it is kept. At the head of each column, $a$, is a small space $y$ for entry of the business and address of the parties with whom the dealings occur, and with whom the debit and credit accounts are kept. Below the spaces $y$ and above the vertical columns, $a$, are placed the names of such parties.

I will now illustrate the method of using this form in keeping accounts, in actual business, and for that purpose will refer to Figs. 2, 3 and 4 in succession.

The heading "The ——— Omnibus Co.," indicates the party keeping the accounts. The titles entered in spaces $y$ indicate the several kinds of dealings or of indebtedness incurred and also the address of the parties with whom accounts are kept, and whose names appear in the large spaces below. Thus—see Fig. 2—the entry "Hardware Anacostia," in the space $y$ of the last of the columns, $a$, indicates the business and place of business of Geo. W., whose name appears below. Again in Fig. 3 the title "Blacksmith, Georgetown," in the third $a$ column, is entered in the $y$ space and indicates the business and place of business of E. D.

By referring to Fig. 2, it will be seen that an account is opened February 1, 1891, by the ——— Omnibus Co., with Geo. W., and that on that date he incurs an indebtedness of $100. also makes a payment of $200. on the same day. The amounts ($100. and $200.) are placed in the respective debit and credit spaces of the first sub-division $x$, below the upper horizontal line $c$. This transaction leaves a credit balance of $100. in W.'s favor, which is accordingly entered on the credit side in the middle space of the second day, as shown by surface-shaded numerals. On the 2d day of February, W. is debited with $200., and thus has a debit balance of $100., which is entered on the debit side of the middle space of the third day, to indicate the state of W.'s account with the beginning of that day. In the column $a'$, for daily totals, the entries are necessarily as follows: on February 1 $100. debit and $200. credit; on March 2., $200. debit, no credit. On the 3d, $400. debit, and no credits. The third column, for grand totals, would of course correspond exactly to the second column $a^2$, if the same were filled out. But, as the account with W. is not closed, but continued into March, as shown in Fig. 3, no entries are made in such column $a^2$. The footings of column $a'$ (Fig. 2), and of the column $a$ of the individual account will correspond, and they are $700. debit and $200. credit, leaving a balance of $500. against W. which debt is duly entered (see surface-shaded numerals) in the middle (debit) space at foot of the individual account, also below the grand total column. The debit and credit entries ($700 and $200.) are also made in the column $a^3$ of "Footings," at bottom of the page. The debit balance $500. is the amount to be transferred to the March account Fig. 3. In other words, that balance is entered on the debit side of W.'s account which is continued into March.

As appears from Fig. 3 W. incurs a further indebtedness of $200. on the 1st of March and this sum added to the amount ($500.) brought forward gives a debit balance of $700, which is entered in the middle or debit balance space of the second (March) day. On the same date W. becomes further indebted in the sum of $125. and this gives a debit balance of $825., entered (as shown) in balance (debit) space of third day. On the same day—the 3d—he adds $300. to such balance. Thus we have $625. as the sum of his new indebtedness incurred in March, while the amount of his entire indebtedness is $1125., as indicated in the debit space at foot of the first (March) column $a$. Still referring to Fig. 3, it appears that on March 1 an account is opened with E. D., blacksmith in Georgetown, and he incurs a debt of $30. on that date and $15. on the third day. Again, J. D. F, engaged in sale of drugs on Pennsylvania avenue, Washington, D. C., becomes indebted $500. on March 1, and pays $100. of account on March 2, leaving thus a debit balance of $400., as indicated by the proper entry in (debit) balance space of third day. It is clear that D.'s account will foot up $45., and F.'s $500., leaving a debit balance for F. of $400.

The daily totals column $a'$ (Fig. 3) expresses the transaction for entire month of March as follows— A debt of $730. was incurred to the —— Omnibus Co. on the first day, another of $125., on the second day with an offsetting credit of $100., and another of $315. on the third day. The entries in the daily totals column $a'$ and grand totals column $a^2$, correspond.

In Fig. 4, E. R. P. has an account with $40. debit and $60. credit, on March 1, and $30. on March 2. The credit balance of $20., with which the first day closes, is entered in credit-balance space of second day. W. M. also has an account as shown. In the daily totals column $a'$ (Fig. 4), the aggregate for March 1, of P.'s and M.'s accounts, is $140. debit and $260. credit, for March 2 $30. debit and $10. credit, and for the third day $100. debit and $800. credit. The footings of column $a'$ are accordingly $770. debit and $1070. credit, as shown. leaving a credit balance of $300. Now, supposing all accounts to be closed and a grand balance struck, the grand totals column $a^2$ (Fig. 4) contains the following entries, namely: on first day, a debit balance of $500., brought forward from W.'s account, and the debit aggregate of $870. (obtained by adding $730. (see Fig. 3) to $140. (see Fig. 4) opposite this entry of $870. is a credit entry of $260. ($40. + $200). This leaves a credit balance of $1110. to begin the second day. The debit entry for the second day is $155.—the aggregate of $125. and $30. (see Figs. 3 and 4). Then, on the second day, there is a credit of $110. ($100+$10). This leaves a grand debit balance of $1155. to begin the third day, when grand aggregates of $915. debit and $800. credit are entered. The footings of the grand totals column $a^3$ (Fig. 4) are therefore $1940. debit and $1170. credit—leaving a grand debit balance of $1270. at closing of the accounts.

The entries in the grand footings place correspond to those of the column $a^2$. Horizontal base column $a^3$ also expresses the footings of the several accounts, as will be readily understood by inspection.

It is apparent from the foregoing that this form of account effects a great saving of labor and time in keeping daily debits and credits and ascertaining and recording daily balances. The daily payments and receipts in business transactions are indicated so as to be ascertainable at a glance, as are also the totals debits and credits accrued and given each day as well as during the whole period business has been carried on.

Having thus described my invention, what I claim and desire to secure by Letters Patent is:

1. The improved form for accounts consisting of the parallel, vertical columns divided by transverse lines, $c$, to form spaces, $x$, corresponding to days of the month and which are subdivided for original debit and credit entries and for debit and credit balances, and two other vertical columns, $a'$, $a^2$, arranged alongside the former and similarly sub-divided, respectively, for totals of daily debits and credits and for grand totals of all proceeding debits and credits, and being provided at the top of columns $a'$ $a^2$ with the headings "Daily totals" and "Grand totals," as shown and described.

2. The improved form for accounts comprising a sheet having the following characteristics, to wit; a series of parallel, vertical columns, $a$, divided by transverse lines, to form spaces corresponding to days of the month, which spaces are sub-divided into smaller spaces for debits and credits and other special entries, as specified, the said columns having spaces or headings indicating the kinds of business, and the addresses of parties, also spaces beneath said headings for entry of names of the parties carrying on the several kinds of business indicated by the headings, the two side columns $a'$ and $a^2$ for, respectively, indicating the totals of each day's debits and credits and the grand totals of debits and credits for the whole proceeding time in which business has been transacted; and provided above said columns $a'$ $a^2$ with the headings "Daily totals" and "Grand totals" spaces for monthly footings; and a horizontal foot column $a^3$, sub-divided for entry of monthly footings or totals of individual accounts and their aggregates, and spaces for entering the grand aggregates of all the debits and credits of an entire month, and provided above the said divisions with the headings footings and "Grand footings" as shown and described.

THEODORE MILES BROWN.

Witnesses:
GEO. C. LOOMIS,
JOE. R. HUBBARD.